United States Patent [19]
Zeller, III et al.

[11] Patent Number: 5,215,727
[45] Date of Patent: Jun. 1, 1993

[54] METHOD OF MAKING CHROMIC OXIDE

[75] Inventors: Robert L. Zeller, III; Karl W. Seper, both of Youngstown; Russell J. Morgan, Grand Island, all of N.Y.

[73] Assignee: Occidental Chemical Corporation, Niagara Falls, N.Y.

[21] Appl. No.: 857,558

[22] Filed: Mar. 25, 1992

Related U.S. Application Data

[63] Continuation-in-part of Ser. No. 487,313, Mar. 2, 1990, Pat. No. 5,133,947.

[51] Int. Cl.$^5$ ............................................. C01G 37/02
[52] U.S. Cl. ................................................................. 423/55
[58] Field of Search .......................................... 423/55

[56] References Cited

U.S. PATENT DOCUMENTS

| | | | |
|---|---|---|---|
| 2,833,645 | 5/1958 | Erasmus | 75/84 |
| 2,850,378 | 9/1958 | Cooper | 75/84 |
| 3,065,095 | 11/1952 | Foos | 106/300 |
| 3,090,670 | 5/1963 | Stambaugh | 23/140 |
| 4,033,867 | 7/1977 | Jacques | 423/55 |
| 4,298,582 | 11/1981 | Menashi | 423/58 |
| 4,367,213 | 1/1983 | Fiorucci | 423/55 |

OTHER PUBLICATIONS

Kurt-Othmar Encyclopedia, vol. 6, p. 107.
Chemical Abstracts, vol. 22 (1928), p. 3745.
Prakash et al., "Basic Chromium Sulfate-A Manufacturing Perspective," Chemical Age India, 32(11), 975-6, (ENG) 1981.

Primary Examiner—Peter D. Rosenberg
Attorney, Agent, or Firm—Wayne A. Jones; Richard D. Fuerle

[57] ABSTRACT

Disclosed is a method of making hydrated chromic oxide of low sodium content by forming an aqueous solution of sodium bichromate, reducing the sodium bichromate to chromic oxide using sucrose or formaldehyde, which results in the precipitation of chromic oxide, filtering the hydrated chromic oxide, acid repulping and filtering or calcining the hydrated chromic oxide, followed by water repulp and filtering with displacement washing. The color of the particle can be controlled by the drying temperature. A composite particle of hydrated chromic oxide/carbon can be made by forming a slurry of the aqueous solution of sodium bichromate with powdered carbon. The composite particle can be heated to directly produce chrome metal.

23 Claims, No Drawings

METHOD OF MAKING CHROMIC OXIDE

BACKGROUND OF INVENTION

This application is a continuation-in-part of application Ser. No. 07/487,313, filed Mar. 2, 1990 by Edgel P. Stambaugh and Russell J. Morgan, titled "Hydrous Trivalent Chromium Oxide/Carbon Particles," now U.S. Pat. No. 5,133,947.

This invention relates to a method of making chromic oxide having a low sodium content. In particular, it relates to the reduction of sodium bichromate to chromic oxide using sucrose or formaldehyde, and the use of acid repulping or calcining, then displacement filtering, to lower sodium content.

Chromic oxide is used to prepare metallic chromium which is used to make "superalloys" from which turbine blades are made for the aerospace industry. Very high purity chromium is required to make "superalloys" because even very small amounts of impurities can seriously detract from the properties of the alloy. In addition, contaminants such as sodium can create hazards in preparing the chromium metal because metallic sodium can condense out on the equipment and start fires in the presence of moisture.

U.S. patent application Ser. No. 07/487,313 discloses a process for making a composite chromium oxide/carbon particle from which high purity chrome metal can be prepared.

SUMMARY OF INVENTION

We have discovered that if sodium bichromate is reduced to hydrated chromic oxide, using either sucrose or formaldehyde, the sodium content of the hydrated chromic oxide is much lower than when other reducing agents are used. As yet, we have no explanation for these results. The results are especially puzzling since other reducing agents, including even other sugars, are ineffective in producing a hydrated chrome oxide of low sodium content. Unlike some other reducing agents which require high temperatures, we have found that sucrose and formaldehyde are effective at less than 200° C. with high conversion of $Cr^{+6}$ to $Cr^{+3}$.

In addition, the precipitated hydrated chromic oxide is easier to filter compared to hydrated chromic oxide prepared using other sugars, and, surprisingly, hydrated chromic oxide is formed at a lower temperature than when carbon is used as a reducing agent. We have also found that hydrated chrome oxide produced in a batch process according to this invention is better at removing vanadium than chromic oxide produced using other methods.

DESCRIPTION OF THE INVENTION

Sodium bichromate, $Na_2Cr_2O_7.2H_2O$, is typically obtained by roasting chrome ore with soda ash, which forms sodium chromate. The roasted ore is leached with water to dissolve out the sodium chromate, which is then reacted with sulfuric acid or sodium bisulfate to produce a solution of sodium bichromate. The sodium bichromate solution is preferably treated with an insoluble trivalent chromium compound as described in U.S. patent application Ser. No. 07/691,742, filed Apr. 16, 1991, by R.L. Zeller, Russell J. Morgan, and U.I. Keller, titled "Vanadium Removal In Aqueous Streams," herein incorporated by reference, to remove vanadium. An aqueous solution of about 5 to about 80 wt% sodium bichromate can be used in this invention, but it is preferable to use about 45 to about 55 wt% sodium bichromate because lower concentrations do not precipitate as much hydrated chromic oxide, and at higher concentrations it may be difficult to pump the hydrated chromic oxide slurry product.

To the solution of sodium bichromate is added a reducing agent, which can be either sucrose, $C_{12}H_{22}O_{11}$, or formaldehyde, HCHO; sucrose is preferred because, from a process hygiene point of view, formaldehyde is a more difficult material to handle. The formaldehyde may be either gaseous or in an aqueous solution; an aqueous solution is preferred because it is easier to handle. Sufficient reducing agent should be present to reduce all of the sodium bichromate in the solution to hydrated chromic oxide. While the amount of reducing agent can be about 50 to about 200 mole% of stoichiometric, it is preferably to use about 10 to about 20 mole% excess reducing agent in order to ensure a complete reaction. The pH of the resulting solution is typically about 4.0 to about 4.5 and no pH adjustment is required.

To make a composite particle of hydrated chromic oxide and carbon that can be heated to directly produce metallic chromium, powdered carbon is added to the solution of sodium bichromate and reducing agent to form a slurry. The amount of carbon added should be sufficient to reduce the hydrated chromic oxide product to chrome metal. Three moles of carbon react with one mole of hydrated chromic oxide and the amount of carbon used can be ±10 mole% of stoichiometric. The carbon should be of high purity so that impurities are not introduced into the resulting chrome metal. The carbon should have a particle size of less than 100 mesh and a high surface area to provide intimate contact with the hydrated chromic oxide, which precipitates onto the surface of the carbon particles. In fact, a high surface area carbon may be preferable as it makes it easier to wash the sodium out and ensures a faster reaction when the chromic oxide is reduced to metallic chromium.

Other insoluble particles can also be added to the sodium bichromate solution in order to form composite particles with the precipitating hydrated chromic oxide. For example, titanium dioxide particles can be used to form chromic oxide/titanium dioxide composite particles for use in making pigments. Also, high surface area aluminum or alumina particles can be used to make a chromic oxide/aluminum or chrome oxide/alumina composite particle for use in an aluminothermic process for producing chrome metal or for use as catalysts.

The solution of sodium bichromate, either containing insoluble particles or not, is heated under pressure to a temperature of about 120° C. At about that temperature the reducing agent begins to reduce the sodium bichromate to hydrated chromic oxide. The reduction reaction is exothermic and carries the temperature and pressure to as high as 300° C. and 1700 psi; the reaction is over within 10 minutes. While we do not wish to be bound by any theories, we believe that the equation for the reduction reaction is:

Using Sucrose

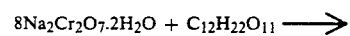

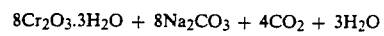

-continued
Using Formaldehyde $$2Na_2Cr_2O_7 \cdot 2H_2O + 3HCHO \longrightarrow$$
$$2Cr_2O_3 \cdot 3H_2O + 2Na_2CO_3 + CO_2 + H_2O$$

It is preferable to perform this reaction on a continuous basis as that provides better control and, at the proper sodium bichromate concentration and feed rate, no addition or removal of heat is required once start up has been accomplished. Also, we have discovered that hydrated chromic oxide particles produced in a continuous process have a different morphology than particles produced in a batch process; continuously produced particles are more spherical, compared to the porous agglomerations of the batch process.

After the reaction, the hydrated chromic oxide precipitate, or the composite particle precipitate containing the hydrated chromic oxide, is filtered. Filtration is preferably accomplished using a rotary drum filter.

In order to achieve a low concentration of sodium, it is necessary to acid repulp the high sodium hydrous chromic oxide followed by filtering with displacement washing, or to calcine the filtered high sodium chromic oxide, then reslurry wash and filter with displacement washing. Acid repulping can be accomplished by mixing the hydrated chromic oxide with acidic water, or with water then acid, to lower the pH from about 9½ to about 10 down to about 2 to about 6. While inorganic or organic acids can be used, hydrochloric acid is preferred because any chloride remaining on the hydrated chromic oxide product is driven off when it is heated to form chromic oxide. Sulfuric acid or phosphoric acid can be used but may leave sulfur or phosphorus behind in the chromic oxide. After about 15 minutes at the lower pH, the hydrated chromic oxide is filtered and displacement washed with water on the filter.

The resulting hydrated chromic oxide product or composite particle product can be dried at a temperature of about 100 to about 200° C. or calcined. At about 100° C. the product is green, at about 150° C. it turns a dark green or brown color, and at about 200° C. it is black. After drying, if desired, the low sodium hydrated chrome oxide particle can also be calcined to form $Cr_2O_3$.

Calcining is described in U.S. Pat. No. 4,296,076, herein incorporated by reference. Calcining consists of heating the hydrated chromic oxide to about 500 to 1200° C., which converts hydrated chromic oxide ($Cr_2O_3 \cdot xH_2O$, where x is greater than 3) to chromic oxide ($Cr_2O_3$). Calcining composite particles of hydrated chromic oxide/carbon should be done in an inert or reducing atmosphere as the presence of oxygen may cause some of the carbon to combust to CO and $CO_2$ (depending on temperature).

After calcining the high sodium hydrous chromium oxide, the resulting anhydrous chromic oxide is reslurried with water and filtered with displacement washing. This is accomplished by mixing the high sodium chromic oxide with fresh water, filtering to near dryness, followed by displacement washing of the cake, and repeating as necessary. Acid repulping or calcining followed by displacement filtering is necessary to reduce the sodium content of the chromic oxide to less than 100 ppm (based on 100% chromium).

The hydrated chromic oxide or anhydrous chromic oxide product can be used as a pigment, or as a raw material to produce leather tanning compounds, or in other applications. In the production of chrome metal either the hydrated o anhydrous chromium oxide is mixed with carbon and a binder and is briquetted, and the briquettes are heated so that the carbon in them reduces the chromic oxide to metallic chromium. The briquettes or the composite particles can be heated directly at up to about 1400° C. for several hours under vacuum to produce metallic chromium.

The following examples further illustrate this invention. Examples 1, 2, 4, 10, 11, 12, and 13 illustrate this invention and Examples 3 and 5 to 9 are comparative examples. Example 10 illustrates the hydrated chromic oxide-carbon particle. Examples 11 and 12 illustrate the continuous process. Example 13 illustrates the calcining process for Na removal. All Na concentrations are on a 100% Cr basis.

EXAMPLE 1: Refined Sugar

A solution was prepared from 810 g of 69% sodium bichromate liquor, 80 g of refined sugar, and 1050 of deionized water. The percent of stoichiometric of the sugar with respect to bichromate was 100%. The solution was placed within an autoclave and heated. When the temperature approached 120° C., an exothermic reaction occurred. The maximum temperature reached was 214° C. The cake was easily filterable and, after processing, contained 168 ppm Na. The conversion of $Cr^{6+}$ to $Cr^{3+}$ was 87.6%.

EXAMPLE 2: Refined Sugar

A solution was prepared from 649.8 g of 69% sodium bichromate liquor, 77.3 g of refined sugar, and 1143.7 g of deionized water. The percent of stoichiometric of the sugar with respect to bichromate was 120%. The sodium was placed within an autoclave and heated. When the temperature approached 120° C., an exothermic reaction occurred. The maximum temperature reached was 214° C. The cake was easily filterable and, after processing, contained less than 181 ppm Na. The conversion of $Cr^{6+}$ to $Cr^{3+}$ was 97.9%.

EXAMPLE 3: Corn Syrup

A solution was prepared from 444 g of sodium bichromate crystals, 152.2 g of corn syrup, and 1357.4 g of deionized water. The percent of stoichiometric of the corn syrup with respect to bichromate was 227%. The solution was placed within an autoclave and heated. When the temperature approached 120° C., an exothermic reaction occurred. The maximum temperature reached was 227° C. The cake was not filterable and, after processing, contained 840 ppm Na. Because of the large excess of reducing agent, the conversion of $Cr^{6+}$ to $Cr^{3+}$ was 100%.

EXAMPLE 4: Formaldehyde

A solution was prepared from 400 g of 69% sodium bichromate liquor, 113 g of 37% formaldehyde solution, and 1185 g of deionized water. The percent of stoichiometric of the formaldehyde with respect to bichromate was 100%. The solution was placed within an autoclave and heated. When the temperature approached 120° C., an exothermic reaction occurred. The maximum temperature reached was 212° C. The cake was easily filterable and, after processing, contained 330 ppm Na. The conversion of $Cr^{6+}$ to $Cr^{3+}$ was 94.9%.

EXAMPLE 5: Methanol

A solution was prepared from 400 g of 69% sodium bichromate liquor, 29.6 g of methanol, and 1253 g of deionized water. The percent of stoichiometric of the methanol with respect to bichromate was 100%. The solution was placed within an autoclave and heated. When the temperature approached 120° C., an exothermic reaction occurred. The maximum temperature reached was 211° C. The cake was filterable and, after processing, contained 540 ppm Na. The conversion of $Cr^{6+}$ to $Cr^{3+}$ was 66.2%.

EXAMPLE 6: Sulfur

A solution was prepared from 400 g of 69% sodium bichromate liquor, 29.6 g of sulfur, and 1253 g of deionized Water. The percent of stoichiometric of the sulfur with respect to bichromate was 100%. The solution was placed within an autoclave and heated. The maximum temperature reached was 210° C. The cake was filterable and, after processing, contained 160 ppm Na. The conversion of $Cr^{6+}$ to $Cr^{3+}$ was 12.7%.

EXAMPLE 7: Acetic Acid

A solution was prepared from 400 g of 69% sodium bichromate liquor, 41.9 g of acetic acid, and 1253 g of deionized water. The percent of stoichiometric of the acetic acid with respect to bichromate was 100%. The solution was placed within an autoclave and heated. The maximum temperature reached was 208° C. Very little cake was obtained; after processing, it contained 1780 ppm Na. The conversion of $Cr^{6+}$ to $Cr^{3+}$ was 3.5%.

EXAMPLE 8: Carbon Monoxide

A solution was prepared from 1242 g of sodium bichromate crystals and 1026 g of deionized water. Carbon monoxide was added at 225° C. to reactor from a pressure 600 to 1500 psi, then, after 30 minutes, it was bled off and fresh CO was added. This was done 7 times. The percent stoichiometric of CO with respect to bichromate was much greater than 100%. The final time the temperature of the solution was increased to 300° C., held there for 30 minutes, then cooled. The cake was easily filterable and, after processing, contained 69 ppm Na. The conversion of $Cr^{6+}$ to $Cr^{3+}$ was 41.5%. An autoclave temperature of approximately 300° C. was required to achieve 100% conversion.

EXAMPLE 9: Carbon Black

A solution was prepared from 932.2 g of sodium bichromate crystals, 65.0 g of carbon black, and 1120 g of deionized water. The percent of stoichiometric of the carbon with respect to bichromate was 115%. The solution was placed within an autoclave and heated. When the temperature approached 220° C., an exothermic reaction occurred. The maximum temperature was 311° C. The cake was easily filterable and, after processing, contained 2364 ppm Na. The conversion of $Cr^{6+}$ to $Cr^{3+}$ was 89.2%. There was negligible conversion at temperatures less than 200° C.

EXAMPLE 10: Refined Sugar And Carbon

A solution was prepared from 198.7 g of 69% sodium bichromate liquor, 31.4 g of refined sugar, 17.45 g of graphite, and 1638.7 g of deionized water. The percent stoichiometric of the sugar with respect to bichromate was 160%. The amount of graphite added corresponds to a ratio of 3 moles of C for every 2 moles of Cr present. This ratio is related to the amount of carbon required to reduce $Cr_2O_3$ to Cr metal. The solution was placed within an autoclave and heated. When the temperature reached 120° C., an exothermic reaction occurred. After the exotherm, the slurry was heated to 300° C. The cake was easily filterable, and after processing, contained 70 ppm Na. The conversion of $Cr^{6+}$ to $Cr^{3+}$ was 100%.

EXAMPLE 11: Continuous Process

The continuous system consisted of reactant tanks, which fed a diaphragm pump connected to an autoclave. The autoclave discharged through a line, a heat exchanger, a let-down station, and finally, a collection tank. The reactants consisted of a solution prepared form 1040 g of 71.1% sodium bichromate liquor, 160 g of refined sugar, and 753 g of deionized water. The percent stoichiometric of the sugar with respect to bichromate was 151% The diaphragm pump fed the reactants to the bottom of the autoclave. The feedrate was controlled to obtain a residence time of 21 minutes in the autoclave. The autoclave was maintained at 200° C. with either heating or cooling, which was determined by reactant concentration and feedrate. The pressure within the autoclave was maintained at 250 psi by an external pressured nitrogen source. The reacted slurry and some gases (nitrogen, reaction product gases, and water vapor) were removed by a dip tube located at the top of the liquid level in the autoclave. The internal diameter of this dip tube was very small (1/16") in order to ensure proper removal of solids from the autoclave by maintaining a high velocity in the tube. The slurry passed through a heat exchanger and then to a let-down station. The let-down station consisted of two automatic ball valves in series which opened and closed in a controlled manner. If valve 1 is first in the series, the sequence would start with a closed 1 and 2: Sequence: open 1, close 1, open 2, close 2, repeat. The open and close time for both valves are controlled variables, and in this example were 5 seconds open and close for both valves. The let-down station then discharged into a tank. The cake was easily filterable, and after processing, contained 220 ppm Na. The conversion of $Cr^{6+}$ to $Cr^{3+}$ was 95%.

EXAMPLE 12: Batch vs. Continuous Product Properties

Particles prepared from Example 2 were compared to particles prepared from Example 11. The following differences in the products were observed:

|  | BATCH | | CONTINUOUS | |
| --- | --- | --- | --- | --- |
|  | As-is | 1000 C | As-is | 1000 C |
| Bulk Density (g/cc) | 0.59 | 0.66 | 1.24 | 1.20 |
| Tap Density (g/cc) | 0.73 | 0.91 | 1.44 | 1.44 |
| Dustiness | High | | Low | |
| Particle shape | Porous 5-50 μm Dia. agglomerates of fine particles | | Spherical Dia: 5-75 μm | |
|  | Same <0.5 μm crystallites in both | | | |
| Suface Area (m²/g) | 250-320 | | 0.3-0.7 | |
| Vanadium Removal Capacity (g V removed/g | $1 \times 10^{-2} - 1 \times 10^{-1}$ | | $1 \times 10^{-7} - 1 \times 10^{-5}$ | |
|  | Excellent | | Poor | |

|  | BATCH | | CONTINUOUS | |
| --- | --- | --- | --- | --- |
|  | As-is | 1000 C | As-is | 1000 C |
| $Cr^{3+}$) | | | | |

EXAMPLE 13: HCl wash vs Calcination to remove Na

A solution was prepared from 649.8 g of 69% sodium bichromate liquor, 77.3 g of refined sugar, and 1143.7 g of deionized water. The percent stoichiometric of the sugar with respect to the bichromate was 120%. The solution was placed within an autoclave and heated. When the temperature approached 120° C., an exothermic reaction occurred. The maximum temperature was 212° C. The cake was easily filterable. The conversion of of $Cr^{6+}$ to $Cr^{3+}$ was 97.8%. The cake was processed in a variety of ways: (1) No washing, dry only; cake contained 2% Na (20,000 ppm). (2) repulp, HCl to pH=2, displacement wash, dry; cake contained 181 ppm Na. (3) cake calcined at 1000° C. for 1 hr., repulp, displacement wash, dry; cake contained 1403 ppm Na.

We claim:

1. A method of making hydrated chromic oxide comprising
    (A) forming an aqueous solution of sodium bichromate;
    (B) mixing said solution with a reducing agent selected from the group consisting of sucrose and formaldehyde, where the amount of said reducing agent is sufficient to reduce said sodium bichromate in said solution to hydrated chromic oxide;
    (C) heating said solution to a temperature at which said sodium bichromate is reduced to hydrated chromic oxide by said reducing agent, whereby said hydrated chromic oxide precipitates;
    (D) filtering said hydrated chromic oxide;
    (E) acid repulping and filtering or calcining said hydrated chromic oxide; and
    (F) water repulping and displacement filtering said hydrated chromic oxide.

2. A method according to claim 1 wherein said solution contains particles of carbon in an amount sufficient to reduce said hydrated chromic oxide to metallic chromium and said hydrated chromic oxide precipitates onto said particles of carbon to form composite particles.

3. A method according to claim 2 wherein said carbon has a particle size of less then 100 mesh.

4. A method according to claim 2 including the additional last step of heating said composite particles in a vacuum to reduce said chromic oxide to chrome metal.

5. A method according to claim 1 including the additional last steps of forming a compacted mixture of said hydrated chromic oxide with a carbon reducing agent and heating said mixture in a vacuum to reduce said hydrated chromic oxide to chrome metal.

6. A method according to claim 1 wherein said solution contains particles of aluminum in an amount sufficient to reduce said chromic oxide to metallic chromium.

7. A method according to claim 1 wherein said reducing agent is sucrose.

8. A method according to claim 1 wherein said reducing agent is formaldehyde.

9. A method according to claim 1 wherein said solution is heated to about 120° C..

10. A method according to claim 1 wherein the acid used in said acid repulping is hydrochloric acid.

11. A method according to claim 1 wherein, in step (E), said hydrated chromic oxide is acid repulped and filtered.

12. A method according to claim 1 that is run as a continuous process.

13. Particles of hydrated chromic oxide made according to the method of claim 12.

14. A method according to claim 1 including the additional last step of heating said chromic oxide at about 100° C. to produce a green product, at about 150° C. to produce a dark green or brown product, or at about 200° C. to produce a black product.

15. A method according to claim 1 including the additional last step of heating said hydrated chromic oxide to about 500° C. to about 1400° C. to produce an anhydrous chromic oxide product.

16. A method of making composite particles of carbon having hydrated chromic oxide on their surfaces comprising
    (A) preparing a slurry of carbon particles having a particle size less than 100 mesh in a solution of about 5 to about 85 wt% sodium bichromate and a reducing agent selected from the group consisting of sucrose and formaldehyde, where the amount of said reducing agent is sufficient to reduce said sodium bichromate to chromic oxide;
    (B) heating said slurry to about 120° C. under pressure, whereby the exothermic reduction of said sodium bichromate to chromic oxide by reaction with said reducing agent occurs, and said chromic oxide precipitates onto said carbon particles;
    (C) filtering said particles; and
    (D) acid repulping, filtering, and displacement washing said particles.

17. A method according to claim 16 wherein said reducing agent is sucrose.

18. A method according to claim 16 including the additional last step of heating said mixture in a vacuum to reduce said chromic oxide to chrome metal.

19. A method according to claim 16 wherein the acid used in said acid repulping is hydrochloric acid.

20. A method according to claim 16 wherein said solution contains about 30 to about 55 wt% sodium bichromate and the amount of said reducing agent is 10 to 20 mole% in excess of stoichiometric.

21. A method of making metallic chromium comprising
    (A) preparing a slurry which comprises
        (1) an aqueous solution of about 5 to about 85 wt% sodium bichromate and sufficient sucrose to reduce said sodium bichromate to hydrated chromic oxide; and
        (2) carbon particles in an amount sufficient to reduce said hydrated chromic oxide to said metallic chromium;
    (B) heating said slurry under pressure to a temperature sufficient to initiate the exothermic reduction of said sodium bichromate to said hydrated chromic oxide, whereby said chromic oxide precipitates on said particles of carbon;
    (C) filtering said particles;
    (D) acid repulping, filtering, displacement washing, and drying said particles; and
    (E) heating said particles up to about 1400° C. for several hours under vacuum.

22. A method according to claim 21, wherein said sodium bichromate is about 30 to about 55 wt% of said solution and the amount of said sucrose is about 10 to about 20 mole% in excess of the amount required to reduce said hydrated chromic oxide to metallic chromium.

23. A method according to claim 21 that is run continuously, wherein said slurry is initially heated to about 120° C. to begin said reduction.

* * * * *